United States Patent [19]

Wise

[11] 4,300,478
[45] Nov. 17, 1981

[54] AQUARIUM STRUCTURE

[76] Inventor: Bennett L. Wise, 617 N. Main St., Marion, Ohio 43302

[21] Appl. No.: 21,433

[22] Filed: Mar. 16, 1979

[51] Int. Cl.³ ............................................. A01K 64/00
[52] U.S. Cl. .......................................... 119/5; 47/69
[58] Field of Search .............. 119/3, 5; 47/69; D30/6, D30/7, 8, 9, 10, 11, 12

[56] References Cited

U.S. PATENT DOCUMENTS

| | | | |
|---|---|---|---|
| 192,595 | 7/1877 | Palen et al. | 119/5 X |
| 917,863 | 4/1909 | Hartwick | 47/81 X |
| 1,314,033 | 8/1919 | Willems | 119/77 |
| 1,943,417 | 1/1934 | Bringman | 119/5 |
| 2,519,166 | 8/1950 | White | 47/79 |
| 2,529,627 | 11/1950 | Oldfield | 119/77 |

FOREIGN PATENT DOCUMENTS 854306  11/1960  United Kingdom .................... 47/69

Primary Examiner—Gene Mancene
Assistant Examiner—Robert P. Swiatek
Attorney, Agent, or Firm—Harry M. Weiss

[57] ABSTRACT

The aquarium is formed such that the upper extremity of the structure is positioned above its access opening. The access opening is configured such that air may not enter the upper extremity of the aquarium directly and, consequently, atmospheric pressure acting upon the liquid through the access opening maintains the liquid in the aquarium top.

8 Claims, 5 Drawing Figures

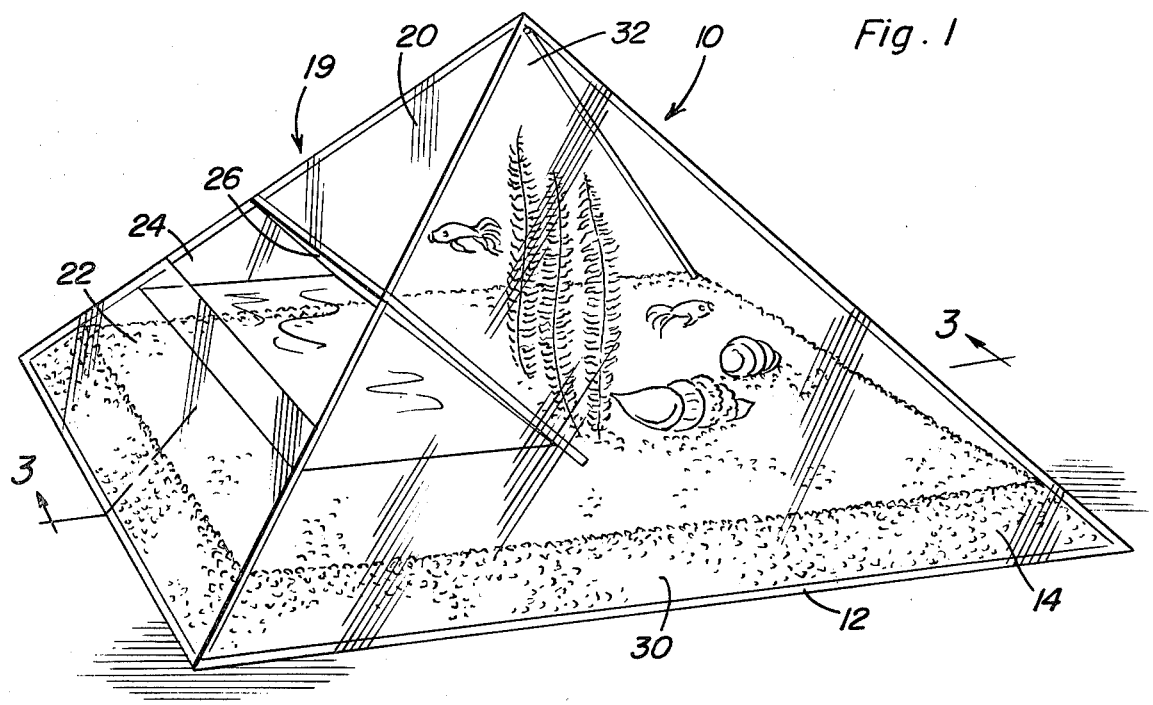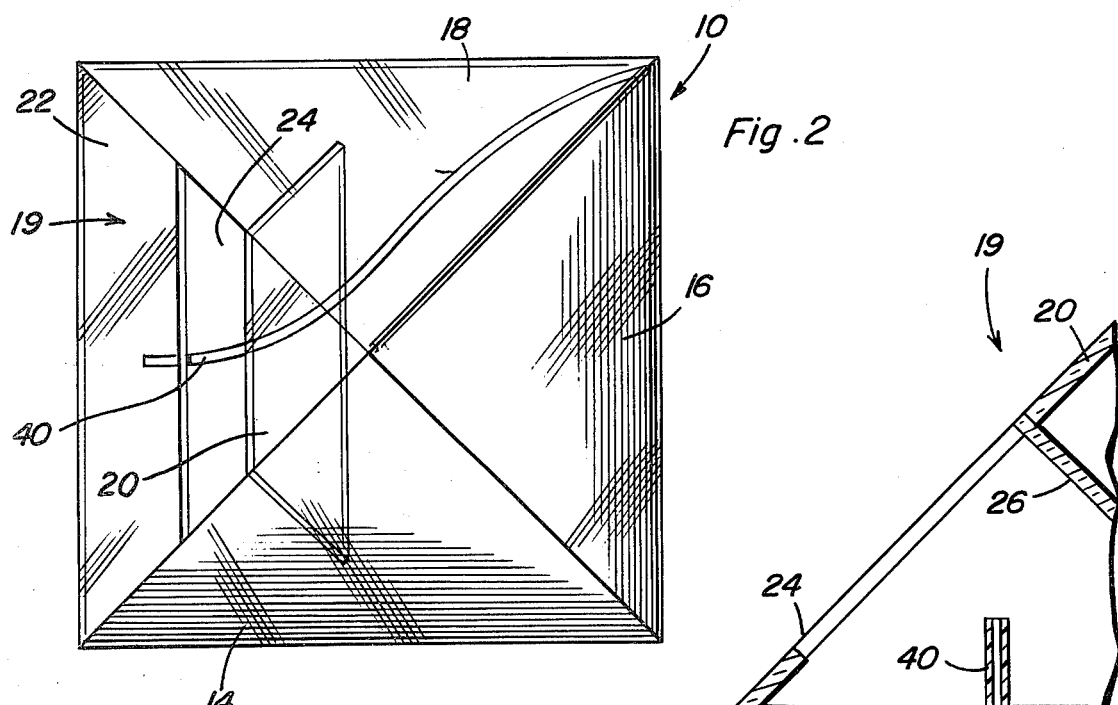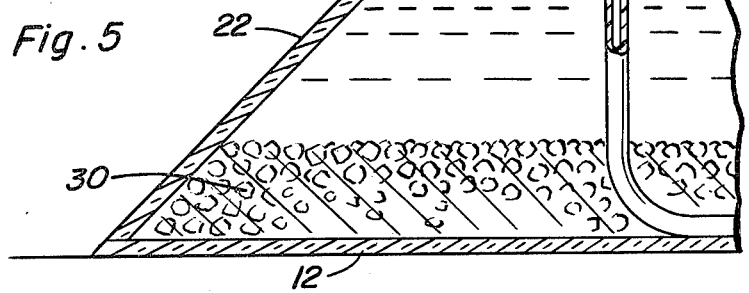

AQUARIUM STRUCTURE

BACKGROUND OF THE INVENTION

1. Field of the Invention

This invention relates to aquarium devices, and especially a unique aquarium device wherein liquid is maintained above the access aperture of the aquarium.

2. Description of the Prior Art

For years, aquariums have been utilized as an interior decoration for homes by enhancing the natural beauty of aquatic plants and animal life. Furthermore, aquariums serve as an instructional aid for one to easily observe the habits of aquatic life.

Naturally, since aquariums are designed as a habitat for living creatures, there must be a means of providing ready access to the aquarium interior in order that the water of the aquarium may be aerated as well as food supplied to the creatures living therein. In the past, known aquariums have provided such an access opening in the top portion of the aquarium thus detracting from the natural beauty of the aquatic scene. Examples of such aquariums include that shown in U.S. Pat. No. Des. 231,677, issued May 21, 1974, to Miller. The Miller aquarium incorporates a uniquely designed cap to cover the opening in the aquarium top. U.S. Pat. No. Des. 238,688, issued Feb. 3, 1976, to Shalom, shows an aquarium having a standard rectangular shape with an open top. U.S. Pat. No. 2,494,937, issued Jan. 17, 1950, to Gandy, shows an aquarium having an inverted pyramidal shape, and also including an open top.

SUMMARY OF THE INVENTION

The aquarium of the present invention includes an enclosed bottom and four converging triangular side walls. One of the side walls has an aperture cut therein which extends between the two opposed side walls adjacent to the apertured side wall. A partition extends from the top of the aperture along the opposed side walls adjacent the apertured side wall to a position below the bottom of the aperture. In this manner when the pyramid is filled with liquid, and the air is removed from the apex of the pyramid, the atmospheric pressure acting upon the liquid in the aperture will maintain liquid in the apex of the pyramid. A tube may be connected to the apex and extended out of the aperture for removing any air trapped in the apex during the filling process.

Accordingly, the present invention provides an aquarium which is simple and inexpensive in construction yet unique in its functional appearance.

A further object of the present invention is to provide an aquarium which includes an access aperture disposed in the side of the aquarium rather than in the top thereof.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the aquarium.

FIG. 2 is a plan view of the aquarium.

FIG. 5 is a sectional view of the aquarium showing the evacuation tube disposed therein.

DESCRIPTION OF THE PREFERRED EMBODIMENT

Figure 3:
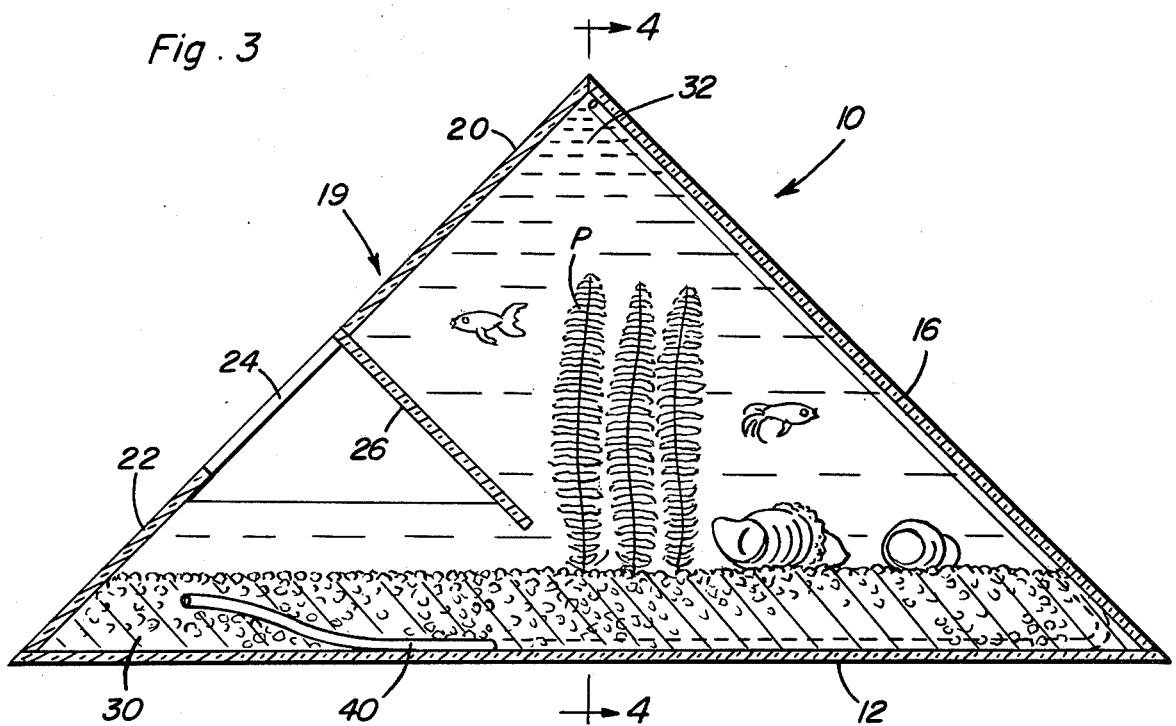
FIG. 3 is a side elevational view taken substantially along a plane passing through section line 3—3 of FIG. 1.

Now with reference to the drawings, the aquarium generally referred to by the numeral 10 will be described in detail. The aquarium includes an enclosed bottom 12 which may be made from glass, thermoplastic, or any other suitable material. The bottom is attached to three identical triangular side walls 14, 16 and 18. These side walls are made from glass, clear thermoplastic, or any other suitable transparent material and may be bonded together along their respective meeting edges by any suitable bonding agent as is known in the art. The fourth aquarium wall, generally designated 19, comprises an upper wall portion 20 and a lower wall portion 22. An aperture 24 is formed therebetween and extends between walls 14 and 18. Connected to wall portion 20 is baffle wall 26 which is connected directly to the side walls 14 and 18 and extends to a position below the top of lower wall portion 22, thus defining a horizontal opening intermediate the upper edge of wall 22 and the lower edge of wall 26 which dictates the level to which the liquid disposed in the aquarium can rise.

As is evident from the drawings, gravel, small colored stones, or the like, may be disposed in the bottom of the aquarium as shown at 30, and vegetation may be planted therein as shown at P, with fish, snails, or other creatures also living in the aquarium. With the aquarium disposed upon a tabletop or other flat, horizontal surface, it may be filled with water in an appropriate manner as will be described hereinafter, at which time the apex shown at 32 will remain entirely filled due to a lack of a direct passage between the opening 24 and the apex 32 through which air may enter the apex. This lack of passage is produced by baffle wall 26 and its disposition with its lower edge below the uppermost edge of wall 22. It should be noted that the pyramidal shape of the aquarium is not necessary for proper functioning. Other aquarium shapes may serve as well so long as an aperture is formed in the side having an outer wall as at 22 which extends to a position above an inner wall as at 26. Thus, the aquarium may be designed in the shape of a rectangle, trapezoid, or any other desired shape.

Figure 4:
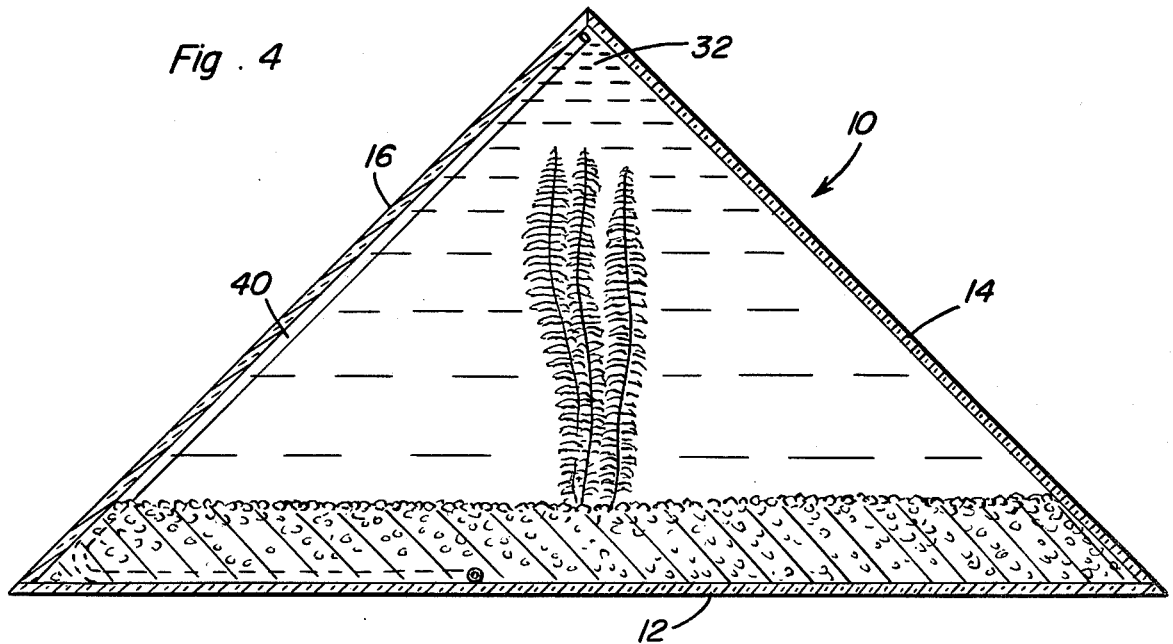
FIG. 4 is a front elevational view taken substantially along a plane passing through section line 4—4 of FIG. 3.

In order to fill the aquarium with water, it is necessary to remove the residual air from the area of the apex 32. To accomplish this function, an evacuation tube 40 may be disposed in the aquarium extending from apex 32 to the vicinity of the opening 24. This tube may be fixed in place by gluing or any other suitable means and can run down from the apex along one of the joints formed between the walls as shown in FIGS. 2 through 4. The tube may be extended along the aquarium bottom beneath the rocks or pebbles 30 so as to be inconspicious. The free end of the tube may be buried under rock or pebbles 30 as shown in FIG. 3. When filling the aquarium, the free end of tube 40 should be raised above the level of wall 22, as indicated in FIG. 5, and water may be introduced to the aquarium interior at the same time that air is removed by suction through tube 40. In this manner, the water will be drawn up into the top of the aquarium until the apex 32 is completely filled at which time the suction should be removed from tube 40. Of course, if the aquarium is of a very small size, manual manipulation of the entire structure may suffice to properly fill the interior thereof.

The foregoing is considered as illustrative only of the principles of the invention. Further, since numerous modifications and changes will readily occur to those skilled in the art, it is not desired to limit the invention to exact construction and operation shown and described, and accordingly, all suitable modifications and equivalents may be resorted to, falling within the scope of the invention.

What is claimed as new is as follows:

1. An aquarium structure capable of maintaining a liquid therein at a level above an access opening in the aquarium, comprising:
   a bottom portion;
   a top enclosure structure connected to said bottom portion for defining the aquarium interior;
   a side opening formed in said top enclosure and disposed medially between said bottom portion and the top extreme of said enclosure structure, said side opening being formed in a horizontal plane;
   said side opening is formed in said enclosure structure between an outer wall relative to the center of said aquarium and an inner wall relative to the center of said aquarium, said outer wall rising from below the bottom of said inner wall to a height above the bottom of said inner wall, said inner wall extending laterally across the entire top enclosure and acting to block the path of air or other gas from said side opening to the inner top extreme of the aquarium when the aquarium is filled with liquid, and liquid disposed within and filling the interior of the aquarium including the top extreme of the enclosure structure above said side opening.

2. The aquarium structure of claim 1 and further including an evacuation means extending from said side opening to the top extreme of said enclosure for providing an evacuation path for air entrapped in said enclosure.

3. The aquarium structure of claim 1 wherein said top enclosure structure includes a plurality of side walls and said side opening extends laterally entirely across one of said side walls and further wherein said inner wall comprises a baffle wall which extends downwardly from above said side opening.

4. The aquarium structure of claim 3 and further including evacuation means extending from said opening to the top extreme of said enclosure structure for providing an evacuation path for air entrapped in said enclosure structure.

5. The aquarium structure of claim 3 wherein said side walls are mutually converging planar side walls forming a pyramidal shape.

6. The aquarium structure of claim 5 wherein the baffle wall has ends which extend along and are connected to opposite sides of the pyramidal configuration.

7. The pyramid structure of claim 6 wherein an evacuation tube means is disposed within the aquarium structure extending from the apex of the pyramid along one interconnection of two pyramidal walls, along the bottom of the structure and to a position proximate the side opening.

8. The structure of claim 7 wherein an ornamental gravel material is disposed along the bottom of the aquarium structure in covering relation to a portion of said evacuation tube.

* * * * *